US008484326B2

(12) United States Patent
Storrie et al.

(10) Patent No.: US 8,484,326 B2
(45) Date of Patent: Jul. 9, 2013

(54) APPLICATION SERVER BILLING (75) Inventors: John Storrie, Maidenhead (GB);
Anthony Waters, Maidenhead (GB);
Julian Mitchell, Maidenhead (GB)

(73) Assignee: Rockstar BIDCO LP, New York, NY (US)

( * ) Notice: Subject to any disclaimer, the term of this patent is extended or adjusted under 35 U.S.C. 154(b) by 794 days.

(21) Appl. No.: 11/536,152

(22) Filed: Sep. 28, 2006

(65) Prior Publication Data
US 2008/0082643 A1 Apr. 3, 2008

(51) Int. Cl.
*G06F 15/173* (2006.01)

(52) U.S. Cl.
USPC ............................................ 709/223; 709/200

(58) Field of Classification Search
USPC ............................................................ 709/223
See application file for complete search history.

(56) References Cited

U.S. PATENT DOCUMENTS

| 6,915,124 | B1* | 7/2005 | Kiessling et al. | 455/411 |
| 7,096,224 | B2* | 8/2006 | Murthy et al. | 707/763 |
| 7,207,048 | B2* | 4/2007 | McQuillan et al. | 719/328 |
| 7,430,200 | B2* | 9/2008 | Hillenbrand et al. | 370/352 |
| 7,457,815 | B2* | 11/2008 | Hsu et al. | 1/1 |
| 7,493,260 | B2* | 2/2009 | Harb et al. | 704/270 |
| 7,698,281 | B2* | 4/2010 | Cunningham et al. | 707/722 |
| 8,010,082 | B2* | 8/2011 | Sutaria et al. | 455/408 |
| 8,086,545 | B2* | 12/2011 | Vallinen et al. | 705/400 |
| 2003/0048891 | A1* | 3/2003 | Broussard et al. | 379/201.03 |
| 2003/0096592 | A1* | 5/2003 | Moreau et al. | 455/406 |
| 2003/0151633 | A1* | 8/2003 | George et al. | 345/864 |
| 2003/0177283 | A1* | 9/2003 | Hamilton et al. | 709/328 |
| 2004/0068584 | A1* | 4/2004 | Costa-Requena et al. | 709/246 |
| 2004/0122977 | A1* | 6/2004 | Moran et al. | 709/246 |
| 2004/0139012 | A1* | 7/2004 | Koskinen et al. | 705/40 |
| 2004/0193635 | A1* | 9/2004 | Hsu et al. | 707/102 |
| 2004/0224710 | A1* | 11/2004 | Koskelainen et al. | 455/518 |
| 2004/0267645 | A1* | 12/2004 | Pollari | 705/34 |
| 2005/0065801 | A1* | 3/2005 | Poikselka et al. | 705/1 |
| 2005/0071244 | A1* | 3/2005 | Phillips et al. | 705/26 |
| 2005/0136889 | A1* | 6/2005 | Zackrisson et al. | 455/406 |
| 2005/0153686 | A1* | 7/2005 | Kall et al. | 455/412.1 |
| 2005/0154699 | A1* | 7/2005 | Lipkin et al. | 707/1 |
| 2005/0155036 | A1* | 7/2005 | Tiainen et al. | 719/310 |

(Continued)

OTHER PUBLICATIONS

3GPP TS 32.260, 3rd Generation Partnership Project; Technical Specification Group Service and System Aspects; Telecommunication management; Charging Management; IP Multimedia Subsystem charging, 3GPP Organizational Partners, 2006, pp. 1-55.*

(Continued)

*Primary Examiner* — John Follansbee
*Assistant Examiner* — Anthony Mejia
(74) *Attorney, Agent, or Firm* — Barnes & Thornburg LLP (57) ABSTRACT

An Application Server entity in an IP Multimedia Subsystem (IMS) network comprises an interface for interfacing with an application and control logic which is arranged to inspect signalling information received from the application via the interface in the form of Extensible Markup Language (XML). The received signalling information is compared with stored rule data which specifies a relationship between an element in the signalling information and an action that should be taken and output data is generated based on the comparison. The Application Server can output operational measurements and/or charging information which more accurately reflect usage made of the Application Server resources. The need for a separate OSA/Parlay-X gateway can be avoided.

13 Claims, 4 Drawing Sheets

U.S. PATENT DOCUMENTS

| | | | | |
|---|---|---|---|---|
| 2005/0177469 | A1* | 8/2005 | Vallinen et al. | 705/29 |
| 2006/0083242 | A1* | 4/2006 | Pulkkinen | 370/392 |
| 2006/0114913 | A1* | 6/2006 | Cai et al. | 370/395.52 |
| 2006/0114932 | A1* | 6/2006 | Cai et al. | 370/466 |
| 2006/0148446 | A1* | 7/2006 | Karlsson | 455/406 |
| 2006/0239247 | A1* | 10/2006 | Postmus | 370/352 |
| 2007/0027975 | A1* | 2/2007 | Tai et al. | 709/223 |
| 2007/0036312 | A1* | 2/2007 | Cai et al. | 379/126 |
| 2007/0055783 | A1* | 3/2007 | Gourraud | 709/227 |
| 2007/0071221 | A1* | 3/2007 | Allen et al. | 379/265.01 |
| 2007/0088554 | A1* | 4/2007 | Harb et al. | 704/257 |
| 2007/0088836 | A1* | 4/2007 | Tai et al. | 709/227 |
| 2007/0100981 | A1* | 5/2007 | Adamczyk et al. | 709/223 |
| 2007/0121584 | A1* | 5/2007 | Qiu et al. | 370/352 |
| 2007/0159976 | A1* | 7/2007 | Dekeyzer et al. | 370/236 |
| 2007/0189497 | A1* | 8/2007 | Bareis | 379/350 |
| 2007/0190990 | A1* | 8/2007 | Yin | 455/414.3 |
| 2007/0276947 | A1* | 11/2007 | Panattu et al. | 709/227 |
| 2007/0293210 | A1* | 12/2007 | Strub et al. | 455/420 |
| 2007/0299913 | A1* | 12/2007 | Griffin | 709/205 |
| 2007/0300237 | A1* | 12/2007 | Neil et al. | 719/319 |
| 2008/0004007 | A1* | 1/2008 | Kallio | 455/432.2 |
| 2008/0010669 | A1* | 1/2008 | Aittola et al. | 726/3 |
| 2008/0010672 | A1* | 1/2008 | Buffmire | 726/4 |
| 2008/0080478 | A1* | 4/2008 | Storrie et al. | 370/352 |
| 2008/0118052 | A1* | 5/2008 | Houmaidi et al. | 379/265.11 |
| 2008/0195535 | A1* | 8/2008 | Liu | 705/39 |
| 2008/0215736 | A1* | 9/2008 | Astrom et al. | 709/226 |
| 2008/0288643 | A1* | 11/2008 | Suotula et al. | 709/227 |
| 2009/0013049 | A1* | 1/2009 | Alexander | 709/206 |
| 2009/0094611 | A1* | 4/2009 | Danne et al. | 718/105 |
| 2009/0203353 | A1* | 8/2009 | Vallinen et al. | 455/406 |
| 2009/0298462 | A1* | 12/2009 | Karlsson et al. | 455/406 |
| 2010/0061316 | A1* | 3/2010 | Levenshteyn et al. | 370/329 |
| 2010/0177764 | A1* | 7/2010 | Witzel et al. | 370/352 |
| 2011/0282904 | A1* | 11/2011 | Schaedler et al. | 707/769 |

OTHER PUBLICATIONS

A. Ravikiran, "Intracies of Charging Telecom Services", Nov. 2006, Telecommunications Network Strategy and Planning Symposium, 2006 12th Int'l, pp. 1-5.*

* cited by examiner

APPLICATION SERVER BILLING

FIELD OF THE INVENTION

This invention relates to an IP Multimedia Subsystem (IMS) communications network and to implementing applications within such a network.

BACKGROUND TO THE INVENTION

The IP Multimedia Subsystem (IMS) is a Next Generation Networking (NGN) architecture for telecom operators, standardised by the Third Generation Partnership Project (3GPP), which can provide multimedia services to mobile and fixed terminals. IMS uses SIP (Session Initiation Protocol) based signalling and Internet Protocol (IP) connectivity.

Figure 1:
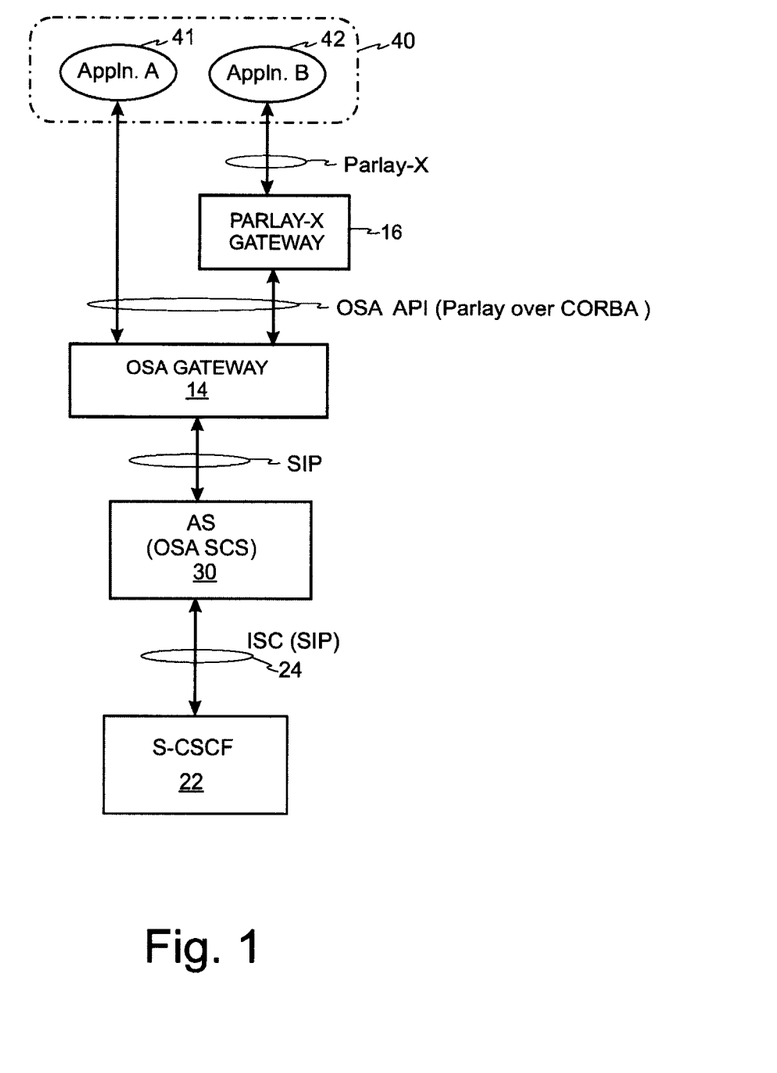
FIG. 1 shows part of a conventional IMS network which supports applications provided by external parties.

A number of CSCF (Call Session Control Function) entities are used to establish a session within the IMS network and process SIP signalling packets. The CSCF entities are the Proxy-CSCF (P-CSCF), Interrogating-CSCF (I-CSCF) and Serving-CSCF (S-CSCF). FIG. 1 shows part of an IMS network which includes the S-CSCF. The S-CSCF is responsible for handling registration processes, making routing decisions and maintaining session states.

Application servers (AS) within an IMS network can host and execute applications which provide services. An Application Server interfaces with the S-CSCF via an IMS Service Control (ISC) interface 24 which uses SIP signalling. Services can include call related services such as Call waiting, Call holding, Call forwarding, Call transfer, Call blocking services. Applications can also provide services such as notifying a user of particular information, such as stock prices or football results. Applications can be provided by the operator of the IMS network, with the application being hosted and executed by a SIP Application Server within the IMS network.

Alternatively, an application can be provided by a third party service provider external to the IMS network, as shown in FIG. 1. An Application Server 30 within the IMS network, called an Open Service Architecture Service Capability Server (OSA SCS), can provide IMS network resources to implement the external service. The S-CSCF communicates with the OSA-SCS over an IMS Service Control (ISM), SIP-based, signalling interface 24. An OSA gateway 14 acts as an intermediary between the OSA SCS 30 and an Application 42 in the IT environment 40. An Application can interface directly with the OSA Gateway 14 via an OSA Application Programming Interface (OSA API), which typically uses Parlay over CORBA. Application 41 interfaces with OSA Gateway 14 in this manner. For Applications which use XML, a Parlay-X interface is used and a Parlay-X gateway 16 is required. Application 42 uses a Parlay-X interface to communicate with the Parlay-X gateway 16. The Parlay-X gateway uses a Parlay interface to communicate with the OSA gateway 14. IT-based applications or web-based services typically exchange data in an XML format, and so the arrangement of gateways 14, 16 is usually required. It can be seen that, with the current architecture, two gateway elements are required whenever an application 42 which uses an XML messaging format is connected to the IMS network. This considerably increases the complexity of implementing services provided by third parties.

An Application Server 30 may be dedicated to a single service, or it may be shared by several services (as shown by 'Application A' 41 and 'Application B' 42 in FIG. 1). Multiple Application Servers 30 can participate in a single session. For example, a particular call between two users may involve a call transfer service and a music-on-hold service.

Currently, Application Server billing triggers are all related to SIP and ISUP protocols and are resident at the CSCF (Call Session Control Function) plane. A disadvantage with this approach is that it is not possible to properly track the IMS network resources used by an IT-based service external to the IMS network. This problem can arise, for example, where an Application Server is used by multiple third parties. While conventional mechanisms can monitor use of the Application Server resources as a whole, they cannot monitor use by particular external applications.

Accordingly, the present invention seeks to reduce, or overcome, this problem.

SUMMARY OF THE INVENTION

A first aspect of the present invention provides an Application Server entity for use in an IP Multimedia Subsystem (IMS) network, the Application Server comprising:
an interface for interfacing with an application; and,
control logic arranged to:
inspect signalling information received from the application via the interface in the form of Extensible Markup Language (XML);
compare the received signalling information with stored rule data which specifies a relationship between an element in the signalling information and an action that should be taken; and,
generate output data on the basis of the comparison.

Web services exchange XML information streams to co-ordinate and action services. By providing an interface and control logic at the Application Server which can inspect XML flows, it is now possible to more accurately monitor usage of the Application Server resources by other entities, especially external applications. Preferably, the control logic outputs operational measurements and/or charging information. A further advantage of providing functionality at the Application Server which can inspect XML data is that the need for a separate OSA/Parlay-X gateway can be avoided.

The incoming XML streams are inspected by the Application Server for key information elements. Comparing the information elements with the stored rules allows the application server to generate a trigger to begin the billing and charging capture process. The capture process acquires the relevant information for use in charging a subscriber for the service. Inspecting XML streams at this point in the network can also ensure that the external applications adhere to limits imposed by the operator of the network.

Preferably, the charging information output by the Application Server is in a form which is compatible with a charging or billing entity in the IMS network. The charging information is preferably compliant with the 3GPP Rf standard as defined in 3GPP TS 32.260. For an offline charging scheme, the charging information can take the form of an Accounting Request for sending to a Charging Data Function (CDF) entity. For an online charging scheme, the charging information can take the form of a Credit Control Request (CCR) for sending to an Online Charging System (OCS).

As the control logic compares received XML data with stored rules, it can generate separate output messages, such as individual Accounting Request messages. Alternatively, the control logic can collate information during the process of comparing the received signalling information with stored rule data, and can output a collated batch of information.

The stored rule data can represent rules for multiple parties, such as: rules of the network operator; rules for a subscriber and rules for governance of the application.

The Application Server can be an Open Service Architecture Service Capability Server (OSA SCS), which interfaces to an external (third party) application.

A further aspect of the present invention provides a method of generating charging information in an IP Multimedia Subsystem (IMS) network, the method comprising, at an Application Server:

receiving signalling information via an interface from an application; and, inspecting the received signalling information in the form of Extensible Markup Language (XML);

comparing the received signalling information with stored rule data which specifies a relationship between an element in the signalling information and an action that should be taken; and, generating output data on the basis of the comparison.

The invention can be implemented by means of hardware comprising several distinct elements, and by means of a suitably programmed computer. Accordingly, another aspect of the invention provides a computer program product comprising a machine-readable medium for causing a processor to implement the method. The machine-readable medium may be an electronic memory device, hard disk, optical disk or other machine-readable storage medium, for example.

BRIEF DESCRIPTION OF THE DRAWINGS

Embodiments of the invention will be described, by way of example only, with reference to the accompanying drawings in which.

DESCRIPTION OF PREFERRED EMBODIMENTS

FIG. 1 shows the provision of services within an IMS network 20 in accordance with an embodiment of the present invention. For clarity, only those parts of the IMS network 20 relevant to the present invention are shown in detail. In this example embodiment it is assumed that a service is provided to a call session involving a user equipment (UE) 12 which accesses the IMS network via an access network 10. Although not shown in detail, access network 10 will typically comprise a Radio Access Node (RAN) supporting a wireless connection with the user equipment 12, and a connection will be established with the IMS network 20 via a Serving GPRS Support Node (SGSN) and a Gateway GPRS Support Node (GGSN). An IMS session will involve a Proxy-Call Session Control Function (P-CSCF) and an Interrogating Call Session Control Function (I-CSCF), both shown generally as part 21 of the IMS network 20, and a Serving-Call Session Control Function (S-CSCF) 22. All of these features are well known. The Serving-Call Session Control Function (S-CSCF) 22 communicates with an Application Server (AS) 30 via an IMS Service Control (ISC) interface 24 which uses SIP-based signalling. Application Server 30 provides processing resources for implementing the service. As described above, the processing resources of an Application Server can be used to implement an Application 41, 42 provided by some entity external to the IMS network 20.

Figure 2:
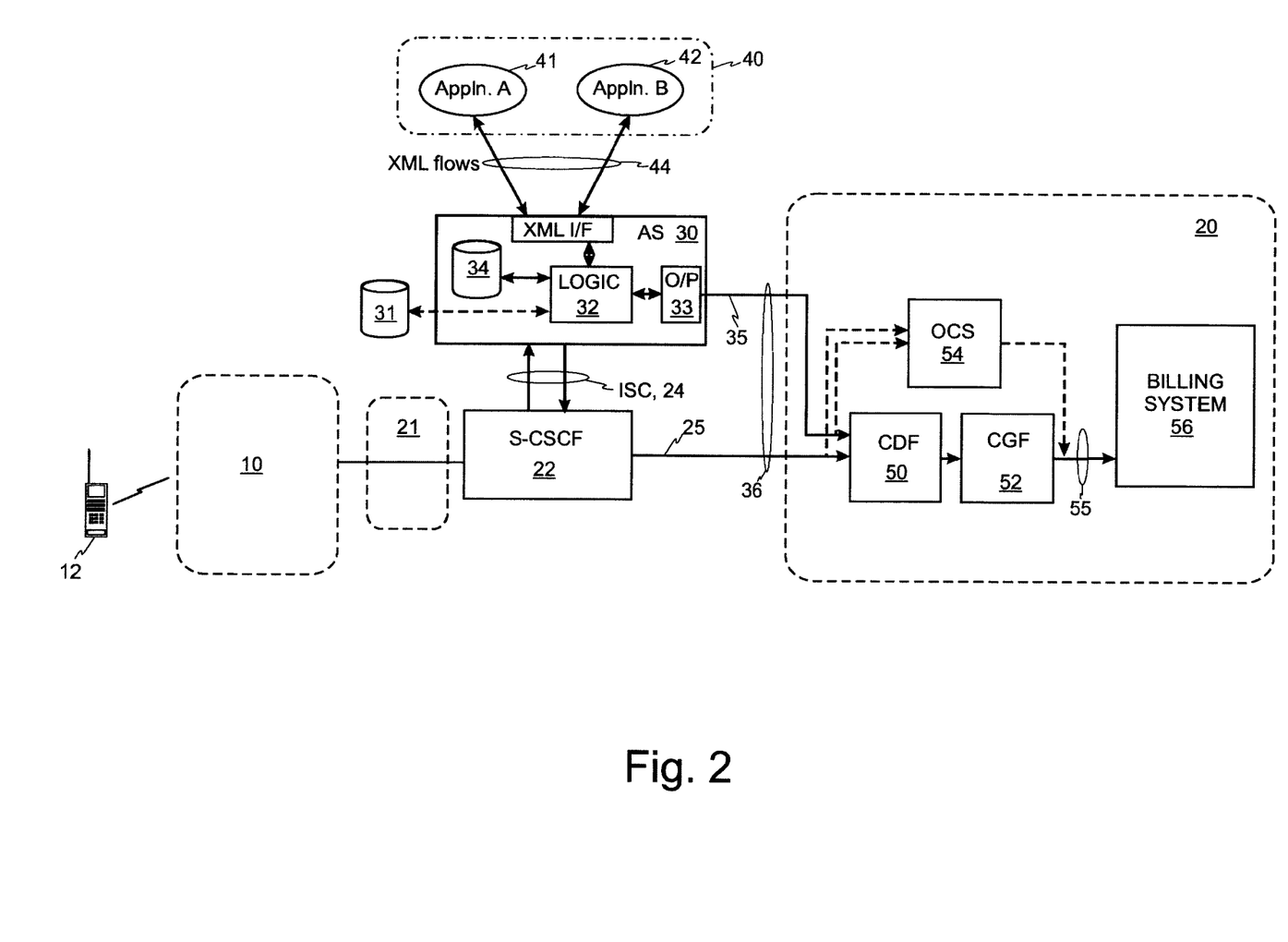
FIG. 2 shows an IMS network according to an embodiment of the present invention.

In accordance with this invention, the interface 44 between the Application Server 30 and the external Applications Servers in the IT environment 40 hosting applications 41, 42 uses signalling messages in the Extensible Markup Language (XML) format. The XML data can be carried as, for example, XML over SOAP.

An Application Server incorporates control logic 32 which inspects the incoming XML data stream received over the interface 44 and compares information elements in the received XML data with stored data. The stored data can take the form of rules which specify an action that should be taken in response to a particular information element being received in the received XML data. Stated another way, the control logic 32 performs a filtering action on the received data.

A rule can instruct the control logic to look for a particular information element in the received data and to compare the value with a condition, such as a limit, or a range, which is specified in the rule. As an example, a rule can specify a number of messages that a user is allowed to send at a particular tariff and a tariff for the message (e.g. first ten messages per day free of charge, next ten messages per day at a price of $X per message). The inspection process can use rules which include multiple inspection criteria. Alternatively, or additionally, the inspection process can use multiple rules. The control logic 32 can use sets of rules which relate to different parties, such as the operator of the network 20, the subscriber (UE 12), and the provider of the external applications 41, 42. The rules can be stored 34 at the Application Server 30, at a centralised database 31 in the IMS network 20, or at individual databases (102, 104, 106, FIG. 4). Where rules are stored at a database externally of the Application Server 30, the Application Server 30 can perform a query to the database in real-time. The set, or multiple sets, of stored rules can be configured and updated as necessary.

One function which the control logic 32 can perform is a Charge Triggering Function (CTF). The control logic 32 compares information elements in the received data with stored data (billing triggers) which are indicative of charging events where charging information should be generated. The inspection process uses a set of rules. When received data matches one or more of the stored billing triggers (e.g. a condition specified in a rule) the control logic creates an information flow that captures any relevant information and creates an Accounting Request. The Charge Data Function (CDF) will act on this request to generate a charging record which is typically known as a Charging Data Record (CDR). An output function 33 of the Application Server 30 packages the charging information into the required output format. Preferably, the Accounting Request issued by the Application Server is compliant to the 3GPP Rf interface standard as defined in 3GPP TS 32.260 (3rd Generation Partnership Project; Technical Specification Group Service and System Aspects; Telecommunication management; Charging management; IP Multimedia Subsystem (IMS) charging). 3GPP TS 32.260 also defines how each Accounting Request is acknowledged by an Accounting Answer (ACA). It can be seen that because the CTF control logic 32 at the Application Server 30 is now inspecting XML flows, it is now possible to more accurately monitor usage of the AS resources by external applications.

One example of a rule is a simple instruction for the control logic to look for a particular information element in the received data, such as a particular subscriber identity (e.g. john@nortel.com), a called party, a calling party, or any other information carried in an XML signalling message carried across the interface, and to create an Accounting Request.

The Accounting Requests 35 are sent to a Charging Data Function (CDF) 50 over an interface 36. The Charging Data Function 50 is a part of the IMS architecture which collates the accounting requests received from the AS, and the accounting requests received from other entities, such as accounting requests 25 received from the S-CSCF 22. The CDF 50 creates a Charging Data Record (CDR) and sends it to a Charging Gateway Function (CGF) 52. The CGF 52 subsequently issues billing information, via an interface 55, to a billing system 56. The billing system will add a charge to a subscriber's account.

Figure 3:
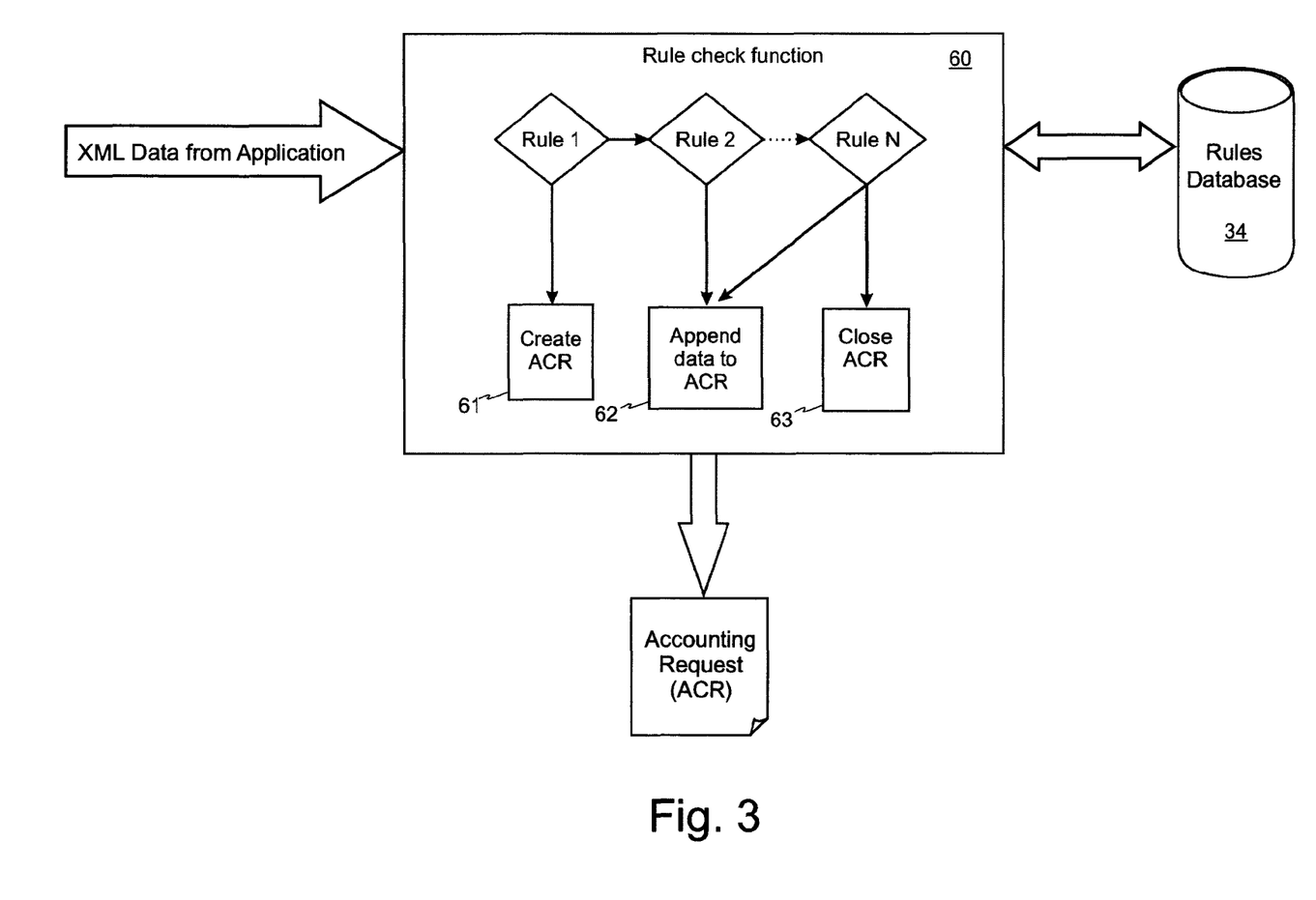
FIG. 3 shows a rule checking function performed by the Application Server of FIG. 2 which collates charging information in a charging data record.

In cases where the comparison process compares the XML data with multiple rules, a separate Accounting Request can be generated on each occasion where a rule instructs the control logic to generate charging information. FIG. 3 schematically illustrates an alternative scheme performed by the control logic 32 at an Application Server 30 in which the comparison process compares all of the XML data in a particular signalling flow against a set of rules, and issues a single Accounting Request which collates all of the charging information which results from the comparison. This can reduce network signalling overheads and the burden of subsequently processing the multiple accounting requests. Application XML data is received by the Rule check function 60. The rule check function 60 checks the XML data against a set of rules (Rule 1, Rule 2, .... Rule N) stored in rules database 34. On the first occasion when a comparison of a rule with the XML data results in a match, a create billing record function 61 is invoked. As an example, a rule may state:

```
If (/incomingData@address='john@nortel.com')
{
    billingRecord=new(billingRecord)
}
``` which creates a new Accounting Request based on match between a particular address stated in the rule with the same address appearing in the received XML data. The rule check function 60 proceeds to compare other rules in the database 34 against the received XML data. On each subsequent occasion when a rule matches the XML data, further data is appended to the Accounting Request by an append data to Accounting Request function 62. A subsequent rule may state, for example:

```
If(/incomingData@applicationRequested='EffectiveCallRoute')
{
    append(billingRecord,EffectiveCallRoute)
}
```

If the incoming XML data structure called incomingData has the field applicationRequested then it is inspected to see if it has the value of 'EffectiveCallRoute. If there is a match, then the incoming information is appended to the Accounting Request which is here called 'billingRecord.'

At the end of the rule checking process, the Accounting Request is closed by a close Accounting Request function 63 and the combined Accounting Request is sent from the Application Server via an output 33.

Charging in an IMS network can be 'offline' or 'online'. The present invention can be applied to either offline or online charging schemes. In an offline charging scheme, charging information is collected as a service is provided for the purpose of later charging a user for the use of that service (e.g. a charge is added to a monthly bill). Offline charging is implemented as described above, with an AS inspecting incoming XML data, comparing elements in the XML data with rules, and issuing Accounting Requests which are sent to a CDF.

In an online charging scheme, a user has an account which defines an amount of credit and a check is made, in real-time, whether the user has sufficient credit before granting or denying access to a service. In an online charging implementation of the present invention, the Application Server 30 inspects incoming XML data and compares elements in the XML data with rules using the control logic 32, and then generates a Credit Control Request (CCR) to an Online Charging System (OCS) 54. The CCR is preferably sent via the Ro interface as defined in 3GPP 32.360. The OCS 54 will compare the request with the subscriber's available credit and will reply with a Credit Control Authorisation (CCA) if sufficient credit exists. As the authorised credit is used up, or as stored rules are triggered at the control logic 32, further credit control requests may be sent from the control logic 32 to the OCS 54. At the end of the session, the control logic 32 will inform the OCS 54 to allow it to release any unused credit. The OCS 54 is responsible for keeping the Billing System informed of the usage of credit to allow billing records to be generated.

FIG. 3 schematically illustrates the inspection and comparison processes performed by Application Server 30, using multiple rule sets. An Application 41 provides a score of a sports match (e.g. soccer game) each time a goal is scored. Application 41 is provided by a party who is independent of the operator of the IMS network 20, such as a television company providing sports coverage. Typically, a subscriber will subscribe to the service at some point in time and the service provider will initiate delivery of a message within a predetermined time period of the score in a match changing. Application 41 sends a message 43 over interface 44 which includes XML data. The control logic 32 is shown implementing rules for three separate parties: the IMS network operator; the subscriber and the provider of the external Application. At stage 101, an operational rules database 102 is consulted. The received XML data is compared against the set of operational rules. As a result of checking the operational rules, operational measurement data is captured. Stage 101 shows an example of an operational rule which counts the number of messages received which can be used as an operational measurement for the purposes of network management and may also be used to charge on a per-message basis.

Figure 4:
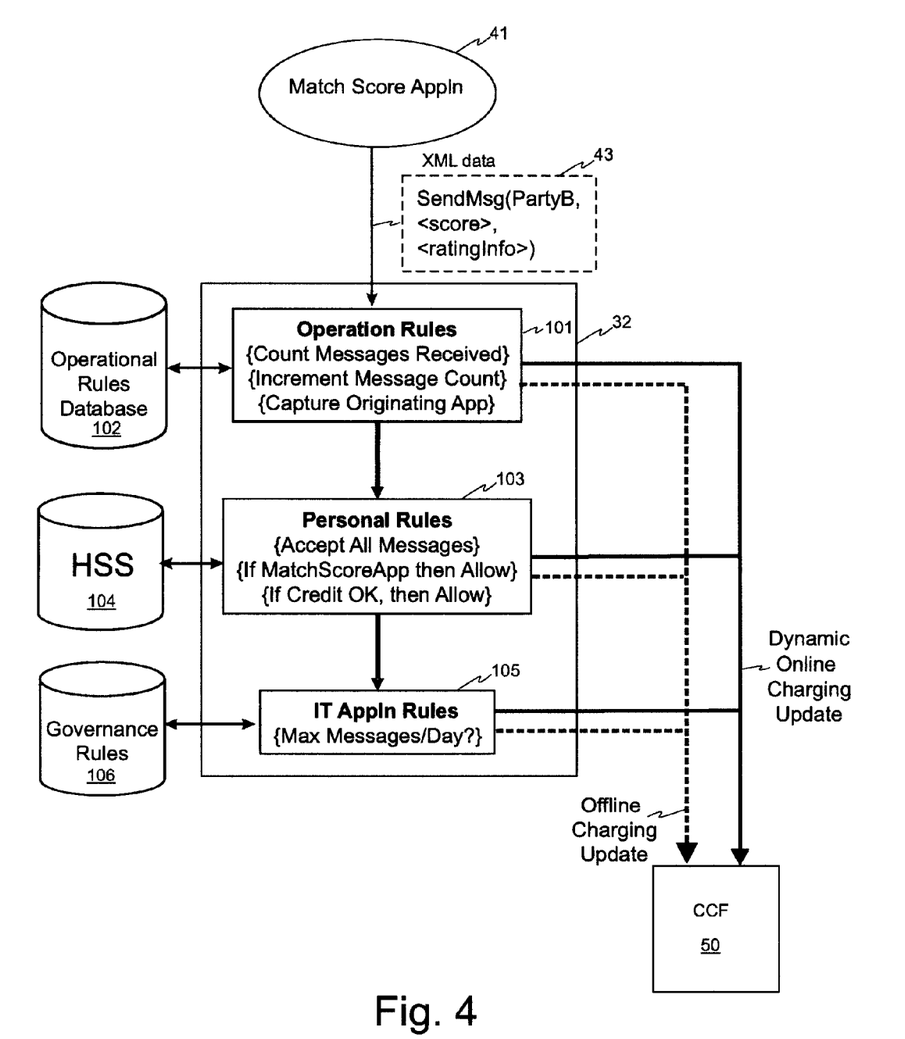
FIG. 4 shows a rule checking function performed by the Application Server of FIG. 2 which uses rules relating to different parties.

At stage 103 a Home Subscriber Server (HSS) 104 is consulted. This invokes a set of rules which are particular to the subscriber, such as a list of applications that the subscriber wishes to receive messages from. The HSS can provide transparent data that is relevant to the specific application and which would only be valid in the scope of the application. Data captured at this stage could be used for charging or operational reasons. If an online charging scheme is used, at stage 103 a credit check can be performed by issuing a Credit Control Authorisation (CCA) message to the Online Charging System 54.

At stage 105 a governance rules database 106 is consulted. This invokes a set of rules which govern the use that Application 41 can make of the IMS network, such as a maximum number of messages that the IMS network will deliver in response to instructions from that Application. The IT application rules can be used to handle and capture data that is related to the governance of the application within the overall network. A particular application may be limited to sending a certain number of messages per day, and this needs to be captured to guarantee the governance. Information captured at this stage can be sent to any interested parties.

Each of the stages described above can be used to capture, and output, operational data or charging information. At each of the stages 101, 103, 105 data can be generated as a result of comparing the received XML data with the rules. The data can be sent after that stage has been completed, or the data can be collated as described above. If generated data is destined for different entities (e.g. charging information destined for a charging entity, operational measurements destined for a network management entity) then the generated data can be collated based on the entity to which that data is destined. Charging information can be based upon the capture of operational data. As an example, if a session lasts for 3 minutes then this is in effect an operational data capture, which can be used to calculate the charging information. The operational data required for charging can be collected by the Application Server.

Although the above description has shown a wireless subscriber 12, the invention is not limited to providing services to wireless subscribers. Any form of access network can be used to connect a user equipment to the IMS network.

The invention is not limited to the embodiments described herein, which may be modified or varied without departing from the scope of the invention.

We claim:

1. An Application Server for use in an IP Multimedia Subsystem (IMS) network, comprising:
   a first interface arranged to enable communication between said application server and a telecommunications server of the IMS network;
   a second interface arranged to enable communication between said application server and an application;
   a processor comprising:
   processing resources for implementing a service provided by said application and providing said service to users of the IMS network via said first interface; and
   control logic arranged to:
   inspect signaling information received from the application via said second interface in the form of Extensible Markup Language (XML);
   compare said received signaling information with stored rule data which specifies a relationship between an element in said signaling information and an action that should be taken including when charging information should be generated; and
   generate charging information on the basis of the comparison; and
   an output arranged to package the charging information into an output format compatible with either a Charging Data Function (CDF) or Online Charging System (OCS) in the IMS network.

2. An Application Server according to claim 1 wherein the output is arranged to issue charging information in the form of Accounting Requests.

3. An Application Server for use in an IP Multimedia Subsystem (IMS) network, comprising:
   a first interface arranged to enable communication between said application server and a telecommunications server of the IMS network;
   a second interface arranged to enable communication between said application server and an application; and
   a processor comprising:
   processing resources for implementing a service provided by said application and providing said service to users of the IMS network via said first interface; and
   control logic arranged to:
   inspect signaling information received from the application via said second interface in the form of Extensible Markup Language (XML);
   compare said received signaling information with stored rule data which specifies a relationship between an element in said, signaling information and an action that should be taken including when charging information should be generated;
   collate charging information during the process of comparing the received signaling information with stored rule data;
   generate charging information on the basis of the comparison; and
   output the collated charging information.

4. An Application Server according to claim 1 wherein the control logic is arranged to access stored rule data representing at least one of: rules of the network operator; rules for a subscriber and rules for governance of the application.

5. An Application Server according to claim 1 wherein the Application Server is an Open Service Architecture Service Capability Server (OSA SCS).

6. An Application Server according to claim 1 wherein the second interface is arranged to interface with an application hosted externally of the IMS network.

7. A method of generating charging information in an IP Multimedia Subsystem (IMS) network, the method comprising:
   connecting users of the IMS network to an application server via a first interface arranged to enable communication between said application server and a telecommunications server of the IMS network;
   receiving signaling information via a second interface arranged to enable communication between said application server and an application, the second interface being part of said application server;
   implementing a service provided by said application and providing said service to users of the IMS network via said first interface;
   inspecting the received signaling information in the form of Extensible Markup Language (XML);
   comparing the received signaling information with stored rule data which specifies a relationship between an element in the signaling information and an action that should be taken including when charging information should be generated;
   generating charging information on the basis of the comparison; and
   packaging the charging information into an output format compatible with either a Charging Data Function (CDF) or Online Charging System (OCS) in the IMS network.

8. A method according to claim 7 wherein the output format is an Accounting Request.

9. A method of generating charging information in an IP Multimedia Subsystem (IMS) network, the method comprising:
   connecting users of the IMS network to an application server via a first interface arranged to enable communication between said application server and a telecommunications server of the IMS network;
   receiving signaling information via a second interface arranged to enable communication between said application server and an application, the second interface being part of said application server;

implementing a service provided by said application and providing said service to users of the IMS network via said first interface;

inspecting the received signaling information in the form of Extensible Markup Language (XML);

comparing the received signaling information with stored rule data which specifies a relationship between an element in the signaling information and an action that should be taken including when charging information should be generated;

collating the charging information during the process of comparing the received signaling information with stored rule data, generating charging information on the basis of the comparison, and outputting the collated charging information.

10. A method according to claim 7 wherein the stored rule data represents at least one of: rules of the network operator; rules for a subscriber and rules for governance of the application.

11. A method according to claim 7 wherein the Application Server is an Open Service Architecture Service Capability Server (OSA SCS).

12. A method according to claim 7 wherein the signaling information is received from an application hosted externally of the IMS network.

13. A computer program product comprising a non-transitory machine-readable medium carrying instructions for causing a processor to implement the method of claim 7.

* * * * *